United States Patent [19]
Abbey et al.

[11] Patent Number: 6,153,719
[45] Date of Patent: Nov. 28, 2000

[54] THIOL-CURED EPOXY COMPOSITION

[75] Inventors: Kirk J. Abbey, Raleigh; Mark W. Pressley, Apex, both of N.C.

[73] Assignee: Lord Corporation, Cary, N.C.

[21] Appl. No.: 09/018,548

[22] Filed: Feb. 4, 1998

[51] Int. Cl.[7] .................................................. C08G 59/68
[52] U.S. Cl. ................................ 528/89; 528/90; 525/529
[58] Field of Search .............................. 523/451; 528/89, 528/90; 525/507, 529

[56] References Cited

U.S. PATENT DOCUMENTS

| | | |
|---|---|---|
| 4,056,548 | 11/1977 | Larsen . |
| 4,223,115 | 9/1980 | Zalucha et al. .......................... 525/455 |
| 4,467,071 | 8/1984 | Dawdy ..................................... 525/112 |
| 4,623,702 | 11/1986 | Grieves et al. . |
| 5,374,668 | 12/1994 | Kanemura et al. ...................... 523/541 |
| 5,470,605 | 11/1995 | Lundeen . |
| 5,604,271 | 2/1997 | Lundeen . |

FOREIGN PATENT DOCUMENTS

| | | |
|---|---|---|
| 53-12995 | 2/1978 | Japan . |
| 61-209281 | 9/1986 | Japan . |
| 63-10131 | 1/1988 | Japan . |
| 5043661 | 7/1988 | Japan . |
| 3-189623 | 8/1991 | Japan . |
| 5178964 | 7/1993 | Japan . |
| 7-242735 | 9/1995 | Japan . |
| WO 89/06666 | 7/1989 | WIPO . |

OTHER PUBLICATIONS

Henkel; "Coatings & Inks Data Sheet CR–101"; Apr. 1992.

*Primary Examiner*—Robert Dawson
*Assistant Examiner*—D. Aylward
*Attorney, Agent, or Firm*—Wayne W. Rupert

[57] ABSTRACT

A composition that includes an epoxy compound, a thiol curing agent, a catalyst and a phosphorus—containing compound having at least one P—OH group and at least one organic moiety characterized by the presence of an ethylenically unsaturated group. The composition is particularly useful as a sealer for an adhesive joint.

28 Claims, No Drawings

6,153,719

THIOL-CURED EPOXY COMPOSITION

BACKGROUND OF THE INVENTION

The present invention relates to a thiol-cured epoxy composition that is particularly useful as a sealer for a joint between two substrates.

Joints often are coated with a sealer or sealant to protect the joint against the penetration of water, oil, salt spray or other potentially harmful liquids. A specific type of joint that preferably is sealed is the joint between two structural members formed by welding or bonding with a structural adhesive. One example is in the joining of lightweight metal and plastic materials in the fabrication, repair and reconstruction of automotive and truck vehicle bodies and component panels and parts such as doors and hoods.

A typical method for bonding such substrates in the automotive industry is described in U.S. Pat. Nos. 5,487,803 and 5,470,416, both incorporated herein by reference. According to this method, an inner panel is positioned within an outer panel with the edge of the outer panel extending beyond the edge of the inner panel. The edge of the outer panel is then folded or crimped over the edge of the inner panel in a process known as hemming and the resulting structure is known as a hem flange. In order to permanently secure the inner panel with respect to the outer panel of the hem flange a structural adhesive is applied between the surfaces of the panel or the two panels are welded together to form a permanent hem flange assembly. A sealer is applied to cover and protect the adhesive or weld joint after the joint has been formed.

A particular problem with sealers used in connection with adhesive joints concerns cure temperature. (Meth)acrylic-based structural adhesives are becoming increasingly popular to form hem flange joints. (Meth)acrylic-based structural adhesives typically are cured at temperatures less than 121° C. (250° F.). Various plastisols that only cure at temperatures greater than 149° C. (300° F.) are currently used as hem flange sealers. However, if the previously applied (meth)acrylic-based adhesive has not itself completely cured before it is exposed during curing of the sealer to temperatures greater than 121° C. (250° F.), the (meth)acrylic-based adhesive tends to volatilize, thus losing its integrity. In addition, induction curing is also becoming increasing popular. Metal substrates can warp when subjected to induction curing at the temperatures required for the cure of plastisol sealants.

Sealers also must be paintable, chemically compatible with the adhesive, exhibit good flow characteristics, adhere to the substrate and joint surface and exhibit flexibility to absorb stresses caused by joint movement. Adhesion to metallic substrates can be especially problematic due to the presence of stamping, milling and drawing oils on the surface that are the result of the joint manufacturing process.

A low temperature curable sealer that exhibits good adhesion to metallic substrates thus would be very desirable.

SUMMARY OF THE INVENTION

According to the present invention, there is provided a composition that cures at approximately the same temperature (in other words, within ±5° C. (±9° F.) or lower than the cure temperature of a (meth)acrylic-based adhesive and that exhibits good adhesion to oil-tainted metallic substrates. In particular, there is provided a sealer composition that cures at ≦121° C. (250° F.). The composition includes an epoxy compound, a thiol curing agent, a catalyst or accelerator and a phosphorus-containing, adhesion-promoting compound having at least one P—OH group and at least one organic moiety characterized by the presence of an ethylenically unsaturated group. It has been discovered that a thiol-cured epoxy system provides the desired low cure temperature and is chemically compatible with a (meth)acrylic-based adhesive. In addition, it has been discovered that the phosphorus-containing compound provides excellent adhesion for a thiol-cured epoxy system, particularly with respect to substrate surfaces that are tainted with oil.

DETAILED DESCRIPTION OF THE PREFERRED EMBODIMENTS

Unless otherwise indicated, description of components in chemical nomenclature refers to the components at the time of addition to any combination specified in the description, but does not necessarily preclude chemical interactions among the components of a mixture once mixed.

The epoxy compound can be any compound that contains an epoxy group having the formula:

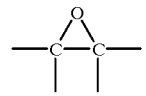

The epoxy compound preferably has a viscosity of at least 50 to 50,000 centipoise at 25° C. Such materials, also known as epoxides, include monomeric epoxy compounds and epoxies of the polymeric type and can be aliphatic, cycloaliphatic, aromatic or heterocyclic. These materials generally have, on the average, at least 1.5, preferably at least 2 polymerizable epoxy groups per molecule. The polymeric epoxies include linear polymers having terminal epoxy groups (for example, a diglycidyl ether of a polyoxyalkylene glycol), polymer skeletal oxirane units (for example, polybutadiene polyepoxide) and polymers having pendant epoxy groups (such as a glycidyl methacrylate polymer or copolymer). The epoxies may be pure compounds but are generally mixtures containing one, two or more epoxy groups per molecule. The "average" number of epoxy groups per molecule is determined by dividing the total number of epoxy groups in the epoxy-containing material by the total number of epoxy molecules present. The molecular weight of the epoxy compound may vary from 130 to 4,000 or more. Mixtures of various epoxy compounds can also be used.

The epoxy compounds may be cycloaliphatic or alicyclic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate; vinylcyclohexene diepoxide; limonene diepoxide; dicyclopentadiene diepoxide; and the like. Other suitable diepoxides of cycloaliphatic esters of dicarboxylic acids are described, for example, in U.S. Pat. No. 2,750,395, incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2- methylcyclohexylmethyl-3,4-epoxy-2-methylcyclohexane carboxylate; 3,4-epoxy-3-methylcyclohexyl-methyl-3,4-epoxy-3-methylcyclohexane carboxylate; 3,4-epoxy-5-methylcyclohexyl-methyl-3,4-epoxy-5-methylcyclohexane carboxylate and the like. Other suitable 3,4-epoxycyclohexylmethyl-3,4-epoxycyclohexane carboxylates are described, for example, in U.S. Pat. No. 2,890,194, incorporated herein by reference.

Further epoxy-containing materials which are particularly useful include those based on glycidyl ether monomers of the formula:

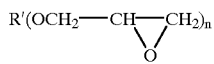

where R' is alkyl or aryl and n is an integer of 1 to 6. Examples are di- or polyglycidyl ethers of polyhydric phenols obtained by reacting a polyhydric phenol with an excess of chlorohydrin such as epichlorohydrin. Such polyhydric phenols include resorcinol, bis(4-hydroxyphenyl)methane (known as bisphenol F), 2,2-bis(4-hydroxyphenyl)propane (known as bisphenol A), 2,2-bis(4'-hydroxy-3',5'-dibromophenyl)propane, 1,1,2,2-tetrakis(4'-hydroxyphenyl)ethane or condensates of phenols with formaldehyde that are obtained under acid conditions such as phenol novolaks and cresol novolaks. Examples of this type are described in U.S. Pat. No. 3,018,262 and in "Handbook of Epoxy Resins" by Lee and Neville (McGraw-Hill Book Co. 1967), both incorporated by reference. Other examples include di- or polyglycidyl ethers of polyhydric alcohols such as 1,4-butanediol, or polyalkylene glycols such as polypropylene glycol and di- or polyglycidyl ethers of cycloaliphatic polyols such as 2,2-bis(4-hydroxycyclohexyl) propane. Other examples are monofunctional resins such as cresyl glycidyl ether or butyl glycidyl ether.

Another class of epoxy compounds are polyglycidyl esters and poly(β-methylglycidyl) esters of polyvalent carboxylic acids such as phthalic acid, terephthalic acid, tetrahydrophthalic acid or hexahydrophthalic acid.

A further class of epoxy compounds are N-glycidyl derivatives of amines, amides and heterocyclic nitrogen bases such as N,N-diglycidyl aniline, N,N-diglycidyl toluidine, N,N,N',N'-tetraglycidyl bis(4-aminophenyl) methane, triglycidyl isocyanurate, N,N'-diglycidyl ethyl urea, N,N'-diglycidyl-5,5-dimethylhydantoin, and N,N'-diglycidyl-5-isopropylhydantoin.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methyl-methacrylateglycidylacrylate and a 62.5:24:13.5 methylmethacrylate-ethyl acrylate-glycidylmethacrylate.

There are a host of commercially available epoxy-containing materials, commonly known as epoxy resins, that can be used as the epoxy compound. In particular, epoxy compounds that are readily available include octadecylene oxide, glycidylmethacrylate, diglycidyl ether of bisphenol A (such as those available under the tradenames EPON 828, EPON 1004 and EPON 1010 from Shell Chemical Co., DER-331, DER-332 AND DER-334 from Dow Chemical Co., and ARALDITE GY 6010 from Ciba-Geigy); vinylcyclohexene dioxide (such as that available under the tradename ERL-4206 from Union Carbide Corp.); 3,4-epoxycyclohexylmethyl-3,4-epoxycyclohexane carboxylate (such as that available under the tradename ERL-4221 from Union Carbide Corp.); 3,4-epoxy-6-methylcyclohexyl-methyl-3,4-epoxy-6-methylcyclohexane carboxylate (such as that available under the tradename ERL-4201 from Union Carbide Corp.); bis(3,4-epoxy-6-methylcyclohexylmethyl) adipate (such as that available under the tradename ERL-4289 from Union Carbide Corp.); bis(2,3-epoxycyclopentyl) ether (such as that available under the tradename ERL-0400 from Union Carbide Corp.); aliphatic epoxy modified with polypropylene glycol (such as those available under the tradenames ERL-4050 and ERL-4052 from Union Carbide Corp.); dipentene dioxide (such as that available under the tradename ERL-4269 from Union Carbide Corp.); epoxidized polybutadiene (such as that available under the tradename OXIRON 2001 from FMC Corp.); silicone resin containing epoxy functionality; flame retardant epoxy resins (such as a brominated bisphenol type epoxy resin available under the tradename DER-580 from Dow Chemical Co.); 1,4-butanediol diglycidyl ether of phenolformaldehyde novolak (such as those available under the tradenames DEN-431 and DEN-438 from Dow Chemical Co.); and resorcinol diglycidyl ether (such as that available under the tradename KOPOXITE from Koppers Company Inc).

The preferred epoxy compounds are di- or polyglycidyl ethers of polyhydric phenols, particularly diglycidyl ether of bisphenol A, and glycidyl ethers.

Thiol curing agents for epoxy compounds are well-known and are described, for example, in U.S. Pat. No. 5,374,668. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-dimercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl) ether, trimethylolpropane tris(thioglycolate), pentaerythritol tetra(mercaptopropionate), pentaerythritol tetra (thioglycolate), ethyleneglycol dithioglycolate, trimethylolpropane tris(β-thiopropionate), tris-mercaptan derivative of tri-glycidyl ether of propoxylated alkane, and dipentaerythritol poly(β-thiopropionate); halogen-substituted derivatives of the aliphatic thiols; aromatic thiols such as di-, tris- or tetra-mercaptobenzene, bis-, tris- or tetra-(mercaptoalkyl) benzene, dimercaptobiphenyl, toluenedithiol and naphthalenedithiol; halogen-substituted derivatives of the aromatic thiols; heterocyclic ring-containing thiols such as amino-4, 6-dithiol-sym-triazine, alkoxy-4,6-dithiol-sym-triazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio)benzene, bis-, tris- or tetra (mercaptoalkylthio)alkane, bis(mercaptoalkyl) disulfide, hydroxyalkylsulfidebis(mercaptopropionate), hydroxyalkylsulfidebis(mercaptoacetate), mercaptoethyl ether bis(mercaptopropionate), 1,4-dithian-2,5-diolbis (mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol. The preferred thiol curing agent is a tris-mercaptan derivative of tri-glycidyl ether of propoxylated alkane commercially available from Henkel Corp. under the trade designation CAPCURE 3-800 and having a generic structure represented by

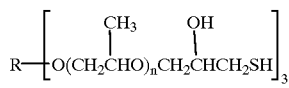

wherein R is an alkyl having from 1 to 5 carbon atoms and n is 1 to 2.

The catalyst or accelerator can be a nucleophilic substance such as an amine, a tertiary phosphine, quaternary ammonium salt with a nucleophilic anion, a quaternary phosphonium salt with a nucleophilic anion, an imidazole, tertiary arsenium salt with a nucleophilic anion and a tertiary sulfonium salt with a nucleophilic anion. Possible amine catalysts include primary, secondary and tertiary amines. Various mixtures of catalysts can be used.

Tertiary amine catalysts are preferred and are described, for example, in U.S. Pat. No. 5,385,990, incorporated herein by reference. Illustrative tertiary amines include methyldiethanolamine, triethanolamine, diethylaminopropylamine, benzyldimethyl amine, m-xylylenedi(dimethylamine), N,N'-dimethylpiperazine, N-methylpyrrolidine, N-methyl hydroxypiperidine, N,N,N'N'-tetramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino) propane, pyridine and the like. Particularly preferred tertiary amines are 1,8-diazobicyclo[5.4.0]undec-7-ene, 1,8-diazabicyclo[2.2.2]octane, 4-dimethylaminopyridine, 4-(N-pyrrolidino)pyridine, triethyl amine and 2,4,6-tris (dimethylaminomethyl)phenol, with 1,8-diazobicyclo [5.4.0]undec-7-ene being especially preferred.

Aliphatic polyamines that are modified by adduction with epoxy resins, acrylonitrile or (meth)acrylates can also be utilized as amine catalysts. In addition, various Mannich bases can be employed as amine catalysts. Aromatic amines wherein the amine groups are directly attached to the aromatic ring can also be used.

Illustrative quaternary ammonium salts with a nucleophilic anion include tetraethyl ammonium chloride, tetrapropyl ammonium acetate, hexyl trimethyl ammonium bromide, benzyl trimethyl ammonium cyanide, cetyl triethyl ammonium azide, N,N-dimethylpyrrolidinim cyanate, N-methylpyridinium phenolate, N-methyl-o-chloropyridinium chloride, methyl viologen dichloride and the like.

The phosphorus-containing adhesion-promoting compound can be any derivative of phosphinic acid, phosphonic acid or phosphoric acid having at least one P—OH group and at least one organic moiety characterized by the presence of an ethylenically unsaturated group, which is preferably terminally located. The ethylenically unsaturated group should be reactive with the thiol curing agent by anionic addition. A listing of such phosphorus compounds is found in U.S. Pat. No. 4,223,115, incorporated herein by reference.

A preferred phosphorus-containing compound has a structure that may be represented by the formula

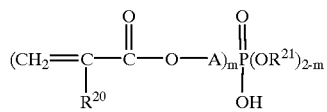

wherein $R^{20}$ is selected from the group consisting of hydrogen, an alkyl group having from one to 8, preferably one to 4, carbon atoms, and $CH_2$=CH—; $R^{21}$ is selected from the group consisting of hydrogen, an alkyl group having from one to 8, preferably one to 4 carbon atoms; A is selected from the group consisting of —$R^{22}$(O)O$R^{22}$O—, —$R^{22}$O— and ($R^{23}$O)$_n$, wherein $R^{22}$ is independently an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Phosphorous-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, 2-hydroxyethyl methacrylate phosphate; phosphate ester of 6-hydroxyhexanoyloxyethyl; bis-(2-methacryloyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of the above formula wherein $R^{20}$ is hydrogen or methyl and $R^{21}$ is propyl, isobutyl, ethylhexyl, halopropyl, haloisobutyl or haloethylhexyl; vinyl phosphonic acid; cyclohexene-3-phosphonic acid; alpha-hydroxybutene-2 phosphonic acid; 1-hydroxy-1-phenylmethane-1,1-diphosphonic acid; 1-hydroxy-1-methyl-1-diphosphonic acid: 1-amino-1 phenyl-1,1-diphosphonic acid; 3-amino-1-hydroxypropane-1,1-diphosphonic acid; amino-tris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl phosphinic acid and allyl methacryloyloxyethyl phosphinic acid.

As used herein, "essential ingredients" of the composition of the present invention refers to the epoxy compound, thiol curing agent, catalyst and phosphorus-containing adhesion-promoting compound. The quantity of ingredients are defined herein relative to the epoxy functionality expressed as an equivalent ratio. The thiol curing agent is present in an amount of 0.5 to 1.5, preferably 0.9 to 1.2. The catalyst is present in an amount of 0.01 to 0.30, preferably 0.02 to 0.10 and the phosphorus-containing compound is present in an amount of 0.005 to 0.200, preferably 0.02 to 0.10, with the proviso that the catalyst should be in excess relative to the amount of phosphorus-containing adhesion promoting compound.

Optionally, a rubber or elastomeric component can be included in the composition to provide toughness and flexibility. The rubber component can be present as a dispersion of precrosslinked rubber in the epoxy compound as known in the art. Examples of precrosslinked rubber compounds available as dispersions in epoxy resins include polyacrylates, polybutadienes, polyisoprenes and the like. The rubber component can also be a precursor such as acrylate-terminated butadienes, and amine-, acrylate-, or epoxy-terminated butadiene-acrylonitrile copolymers.

The composition may also include additives and fillers conventionally found in epoxy systems such as silica, glass, talc, metal powders, titanium dioxide, wetting agents, pigments, coloring agents and the like.

The composition is preferably utilized as a two-part system, but frozen one-part systems can also be used. If employed as a two-part system, the first part includes the epoxy compound and the second part includes the thiol curing agent, the phosphorus-containing compound and the catalyst. The ingredients of each part are mixed together by means well-known in the art. The phosphorus-containing compound is added to the thiol-containing part with the other components at the time of formulation. It is not pre-reacted with the epoxy compound to form an epoxy that include phosphate ester groups in its skeletal structure.

In the preferred two-part system the two parts are metered and mixed together a predetermined time prior to use in a volume ratio of first part:second part of 1:10 to 10:1, preferably 1:1. Preferably, the two parts are mixed together immediately before use, but the composition has an open time of 15, preferably 30, minutes. As used herein, "open time" denotes the time from mixing of the parts to the time at which the mixed composition cures to a point that it is no longer workable.

As discussed above, this composition is particularly useful as a hem flange sealer since it is curable at approximately the same temperature (in other words, within ±5° C. (±9° F.)) or lower than the cure temperature of a (meth)acrylic-based adhesive. In this instance, the two parts of the composition are mixed together, the resulting mixture is applied to an adhesive or weld joint between two substrates so as to substantially cover the joint and then the sealer is subjected to heat having a temperature of ambient to 121° C., preferably 75 to 121° C., for 0.25 to 1.0, preferably 0.25 to 0.50, minutes. The composition can be applied by any conventional method such as a roll coater, brush, curtain coater or robotic dispensing machine.

Structural adhesives that are particularly useful in combination with the sealer are described, for example, in U.S. Pat. Nos. 5,641,834; 4,769,419; 4,467,071; 4,293,665 and 4,223,115, all incorporated herein by reference. In general, these adhesive compositions include at least one free radical-polymerizable monomer and/or polymer, a polymeric material that acts as a rubber toughening agent and a redox catalyst system. The free radical-polymerizable monomer and/or polymer typically includes at least one (meth)acrylic-based material.

The joined substrates that can be sealed include metallic and plastic substrates. Illustrative metallic substrates include steel, iron, aluminum, brass, copper and the like. Examples of plastics include glass-filled epoxy resins, glass-filled polyesters, polyureas and polycarbonates. Particularly common substrates are steel and sheet molding compound (SMC). The present composition can also be useful as an adhesive itself for adhering these types of substrates.

Examples of the invention and a comparative example are described below.

EXAMPLE 1

Twenty g of a digylicidyl ether of bisphenol A-type epoxy (commercially available from Ciba-Geigy under the trade designation ARALDITE GY 6010), 5 g of cresyl glycidyl ether-type epoxy (commercially available from Shell Chemical under the trade designation HELOXY 62), 9 g of glass sphere filler, and 1 g of silica were mixed together to form the first part. Twenty-five g of tris-mercaptan derivative of tri-glycidyl ether of propoxylated alkane (commercially available from Henkel under the trade designation CAPCURE 3-800), 0.25 g of hydroxyethyl methacrylate phosphate (available from Lord Corp.), 0.34 g of 1,8-diazobicyclo[5.4.0]undec-7-ene (available commercially from Air Products under the trade designation POLYCAT SA-610-50), 3 g of glass sphere filler and 1 g of silica are mixed together to form the second part.

EXAMPLE 2

The first part is formulated as described in Example 1. Twenty-five g of tris-mercaptan derivative of tri-glycidyl ether of propoxylated alkane (commercially available from Henkel under the trade designation CAPCURE 3-800), 0.30 g of phosphate ester of 6-hydroxyhexanoyloxyethyl acrylate (available from Nippon Kayaku Co. Ltd. under the trade designation KAYAMER PM-21), 0.40 g of 1,8-diazobicyclo [5.4.0]undec-7-ene (available commercially from Air Products under the trade designation POLYCAT SA-610-50), 3 g of glass sphere filler and 1 g of silica are mixed together to form the second part.

Comparative Example 3

The first part is formulated as described in Example 1. Twenty-five g of tris-mercaptan derivative of tri-glycidyl ether of propoxylated alkane (commercially available from Henkel under the trade designation CAPCURE 3-800), 0.20 g of 1,8-diazobicyclo[5.4.0]undec-7-ene (available commercially from Air Products under the trade designation POLYCAT SA-610-50), 3 g of glass sphere filler and 1 g of silica are mixed together to form the second part. Unlike Examples 1 and 2, Comparative Example 3 does not include a phosphorus-containing, adhesion-promoting compound.

Testing

The first and second parts of each example were mixed together in a volume ratio of 1:1 and the resulting mixture was applied to a flat panel of electrogalvanized steel (EG) or hot-dipped steel (HD). Where indicated the panels were coated with a water-based milling oil. Initial adhesion to the panel was tested after curing at 121° C. (250° F.) and then cooling to room temperature. Adhesion after subjecting the panel to 204° C. (400° F.) for one hour was also tested in order to simulate the postbaking typically applied during the paint cycle to automotive and truck panels and parts. Adhesion is tested by attempting to remove the cured composition with a razor blade. The results are shown in the table below. It is clear that the addition of the phosphorus-containing compound in Examples 1 and 2 provide superior adhesion relative to Comparative Example 3, particularly if there is oil on the substrate.

| Example | Steel Type | Oil | Initial Adhesion | Adhesion After Postbake |
| --- | --- | --- | --- | --- |
| 3 (comparative) | HD | N | poor | fair |
|  |  | Y | poor | poor |
|  | EG | N | good | good |
|  |  | Y | poor | poor |
| 1 | HD | N | good | good |
|  |  | Y | good | good |
|  | EG | N | good | good |
|  |  | Y | good | good |
| 2 | HD | N | good | good |
|  |  | Y | poor | fair |
|  | EG | N | good | good |
|  |  | Y | poor | good |

What is claimed is:

1. A composition comprising:
   (a) an epoxy compound based on glycidyl ether monomers of the formula

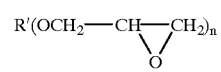

wherein R' is alkyl or aryl and n is an integer of 1 to 6;
   (b) a thiol curing agent;
   (c) a catalyst; and
   (d) a phosphorus-containing compound having at least one P—OH group and at least one moiety characterized by the presence of an ethylenically unsaturated group.

2. A composition according to claim 1 wherein the epoxy compound is a di- or polyglycidyl ether of a polyhydric phenol.

3. A composition according to claim 1 wherein the composition includes more than one epoxy compound.

4. A composition according to claim 1 wherein the thiol curing agent is selected from the group consisting of an aliphatic thiol, an aromatic thiol, a heterocyclic-ring containing thiol, and a thiol compound having at least two mercapto groups and containing sulfur atoms in addition to the mercapto groups.

5. A composition according to claim 1 wherein the catalyst is selected from the group consisting of an amine, a tertiary phosphine, a quaternary ammonium salt of a nucleophilic anion, a quaternary phosphonium salt of a nucleophilic anion, and an imidazole.

6. A composition according to claim 5 wherein the catalyst is a tertiary amine.

7. A composition according to claim 1 wherein the phosphorus-containing compound has a structure represented by the formula

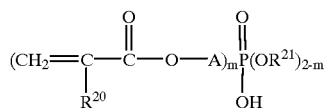

wherein $R^{20}$ is selected from the group consisting of hydrogen, an alkyl group having from one to 8 carbon atoms, and $CH_2=CH-$; $R^{21}$ is selected from the group consisting of hydrogen, an alkyl group having from one to 8 carbon atoms; A is selected from the group consisting of $-R^{22}(O)OR^{22}O-$, $-R^{22}O-$ and $(R^{23}O)_n$ wherein $R^{22}$ is independently an aliphatic or cycloaliphatic alkylene group containing from one to 9 carbon atoms; $R^{23}$ is an alkylene group having from one to 7 carbon atoms; n is an integer from 2 to 10; and m is one or 2.

8. A composition according to claim 7 wherein the phosphorus-containing compound is selected from the group consisting of 2-hydroxyethyl methacrylate phosphate; bis-(2-methacryloyloxyethyl) phosphate; 2-acryloyloxyethyl phosphate; bis-(2-acryloyloxyethyl) phosphate; methyl-(2-methacryloyloxyethyl) phosphate; phosphate ester of 6-hydroxyhexanoyloxyethyl acrylate; ethyl methacryloyloxyethyl phosphate; methyl acryloyloxyethyl phosphate; ethyl acryloyloxyethyl phosphate; compounds wherein $R^{20}$ is hydrogen or methyl and $R^{21}$ is propyl, isobutyl, ethylhexyl, halopropyl, haloisobutyl or haloethylhexyl; vinyl phosphonic acid; cyclohexene-3-phosphonic acid; alpha-hydroxybutene-2 phosphonic acid; allyl phosphonic acid; allyl phosphinic acid; β-methacryloyloxyethyl phosphinic acid; diallylphosphinic acid; β-methacryloyloxyethyl phosphinic acid and allyl methacryloyloxyethyl phosphinic acid.

9. A composition according to claim 8 wherein the phosphorus-containing compound is selected from the group consisting of 2-hydroxyethyl methacrylate phosphate and phosphate ester of 6-hydroxyhexanoyloxyethyl acrylate.

10. A composition according to claim 1 wherein the thiol curing agent is present in an amount of 0.5 to 1.5, the catalyst is present in an amount of 0.01 to 0.30 and the phosphorus-containing compound is present in an amount of 0.005 to 0.200, all based on the equivalent ratio relative to the amount of epoxy functionality in the epoxy compound.

11. A composition according to claim 1 wherein the epoxy compound is a di- or polyglycidyl ether of a polyhydric phenol, the thiol curing agent is selected from the group consisting of a tris-mercaptan derivative of tri-glycidyl ether of propoxylated alkane and 1,3,5-tris(3-mercaptopropyl), the catalyst is a tertiary amine and the phosphorus-containing compound is selected from the group consisting of 2-hydroxyethyl methacrylate phosphate and phosphate ester of 6-hydroxyhexanoyloxyethyl acrylate.

12. A composition according to claim 10 wherein the epoxy compound is a di- or polyglycidyl ether of a polyhydric phenol, the thiol curing agent is selected from the group consisting of a tris-mercaptan derivative of tri-glycidyl ether of propoxylated alkane and 1,3,5-tris(3-mercaptopropyl), the catalyst is a tertiary amine and the phosphorus-containing compound is selected from the group consisting of 2-hydroxyethyl methacrylate phosphate and phosphate ester of 6-hydroxyhexanoyloxyethyl acrylate.

13. A composition according to claim 1 having a cure temperature of $\leq 121°$ C. (250° F.).

14. A composition according to claim 4 wherein the thiol curing agent is selected from the group consisting of a tris-mercaptan derivative of tri-glycidyl ether of propoxylated alkane and 1,3,5-tris(3-mercaptopropyl).

15. A method for sealing a joint between two substrates comprising applying a composition according to claim 1 to a joint between two substrates then subjecting the resulting assembly to an environment having a temperature of ambient to 121° C.

16. A composition according to claim 5 comprising at least two catalysts wherein the first catalyst is an amine and the second catalyst is selected from a quaternary ammonium salt of a nucleophilic anion or a quaternary phosphonium salt of a nucleophilic anion.

17. A composition resulting from the mixture of:
(a) an epoxy compound based on glycidyl ether monomers of the formula

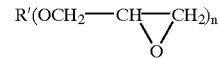

wherein R' is alkyl or aryl and n is an integer of 1 to 6;
(b) a thiol curing agent;
(c) a catalyst; and
(d) a phosphorus-containing compound having at least one P—OH group and at least one moiety characterized by the presence of an ethylenically unsaturated group.

18. A two-part sealant system wherein a first part comprises an epoxy compound based on glycidyl ether monomers of the formula

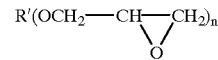

wherein R' is alkyl or aryl and n is an integer of 1 to 6 and a second part comprises a thiol curing agent, a catalyst and a phosphorus-containing compound having at least one P—OH group and at least one moiety characterized by the presence of an ethylenically unsaturated group.

19. A method according to claim 15 comprising applying the composition wherein the epoxy compound is a di- or polyglycidyl ether of a polyhydric phenol, the thiol curing agent is selected from the group consisting of a tris-mercaptan derivative of tri-glycidyl ether of propoxylated alkane and 1,3,5-tris(3-mercaptopropyl), the catalyst is a tertiary amine and the phosphorus-containing compound is selected from the group consisting of 2-hydroxyethyl methacrylate phosphate and phosphate ester of 6-hydroxyhexanoyloxyethyl acrylate.

20. A method according to claim 19 wherein the thiol curing agent is present in an amount of 0.5 to 1.5, the catalyst is present in an amount of 0.01 to 0.30 and the phosphorus-containing compound is present in an amount of 0.005 to 0.200, all based on the equivalent ratio relative to the amount of epoxy functionality in the epoxy compound.

21. A method according to claim 15 comprising applying the composition having at least two catalysts wherein the first catalyst is an amine and the second catalyst is selected from a quaternary ammonium salt of a nucleophilic anion or a quaternary phosphonium salt of a nucleophilic anion.

22. A method according to claim 15 further comprising, prior to the sealing step, applying an adhesive between the two substrates and then adhesively joining the two substrates.

23. A method according to claim 22 wherein the adhesive comprises a (meth)acrylic adhesive.

24. A composition comprising:
(a) an epoxy compound selected from the group consisting of di- or polyglycidyl ethers of polyhydric phenols, di- or polyglycidyl ethers of polyhydric alcohols, di- or polyglycidyl ethers of cycloaliphatic polyols, cresyl glycidyl ether, butyl glycidyl ether, polyglycidyl esters and poly(β-methylglycidyl) esters of polyvalent carboxylic acids, 1:1 styrene-glycidylmethacrylate, 1:1 methyl-methacrylateglycidylacrylate, 62.5:24:13.5 methylmethacrylate-ethyl acrylate-glycidylmethacrylate, octadecylene oxide, glycidylmethacrylate, diglycidyl ether of bisphenol A, vinylcyclohexene dioxide, 3,4-epoxycyclohexylmethyl-3,4-epoxycyclohexane carboxylate, 3,4-epoxy-6-methylcyclohexyl-methyl-3,4-epoxy-6-methylcyclohexane carboxylate, bis(3,4-epoxy-6-methylcyclohexylmethyl)adipate, bis(2,3-epoxycyclopentyl)ether, aliphatic epoxy modified with polypropylene glycol, dipentene dioxide, epoxidized polybutadiene, silicone resin containing epoxy functionality, 1,4-butanediol diglycidyl ether of phenolformaldehyde novolak and resorcinol diglycidyl ether;
(b) a thiol curing agent;
(c) a catalyst; and
(d) a phosphorus-containing compound having at least one P—OH group and at least one moiety characterized by the presence of an ethylenically unsaturated group.

25. A composition according to claim 24 wherein the thiol curing agent is selected from the group consisting of an aliphatic thiol, an aromatic thiol, a heterocyclic-ring containing thiol, and a thiol compound having at least two mercapto groups and containing sulfur atoms in addition to the mercapto groups.

26. A composition according to claim 25 wherein the thiol curing agent is selected from the group consisting of a tris-mercaptan derivative of tri-glycidyl ether of propoxylated alkane and 1,3,5-tris(3-mercaptopropyl), the catalyst is a tertiary amine and the phosphorus-containing compound is selected from the group consisting of 2-hydroxyethyl methacrylate phosphate and phosphate ester of 6-hydroxyhexanoyloxyethyl acrylate.

27. A composition according to claim 24 wherein the thiol curing agent is present in an amount of 0.5 to 1.5, the catalyst is present in an amount of 0.01 to 0.30 and the phosphorus-containing compound is present in an amount of 0.005 to 0.200, all based on the equivalent ratio relative to the amount of epoxy functionality in the epoxy compound.

28. A composition according to claim 24 wherein the phosphorus-containing compound has a structure represented by the formula:

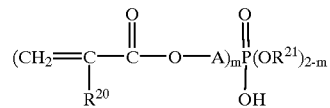

wherein $R^{20}$ is selected from the group consisting of hydrogen, an alkyl group having from one to eight carbon atoms, and $CH_2=CH-$; $R^{21}$ is selected from the group consisting of hydrogen, an alkyl group having from one to eight carbon atoms; A is selected from the group consisting of $-R^{22}(O)OR^{22}O-$, $-R^{22}O-$ and $(R^{23}O)_n$, wherein $R^{22}$ is independently an aliphatic or cycloaliphatic alkylene group containing from one to nine carbon atoms; $R^{23}$ is an alkylene group having from one to seven carbon atoms; n is an integer from 2 to 10; and m is one or two.

* * * * *